April 16, 1935.  O. K. KJOLSETH  1,998,323
BRAKE RIGGING
Filed Sept. 25, 1934  2 Sheets-Sheet 1

Inventor:
Ole K. Kjolseth,
by Harry E. Dunham
His Attorney.

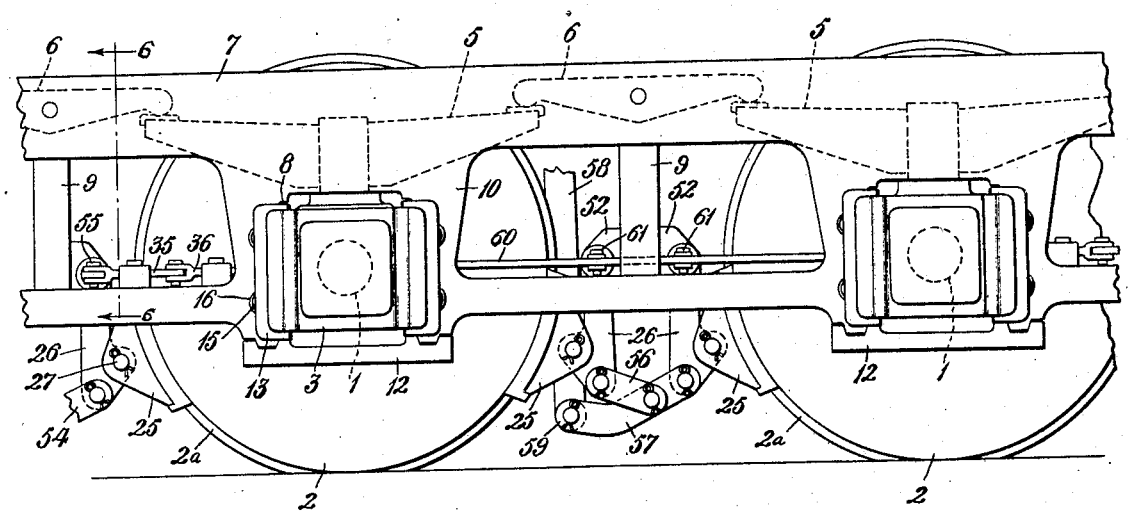
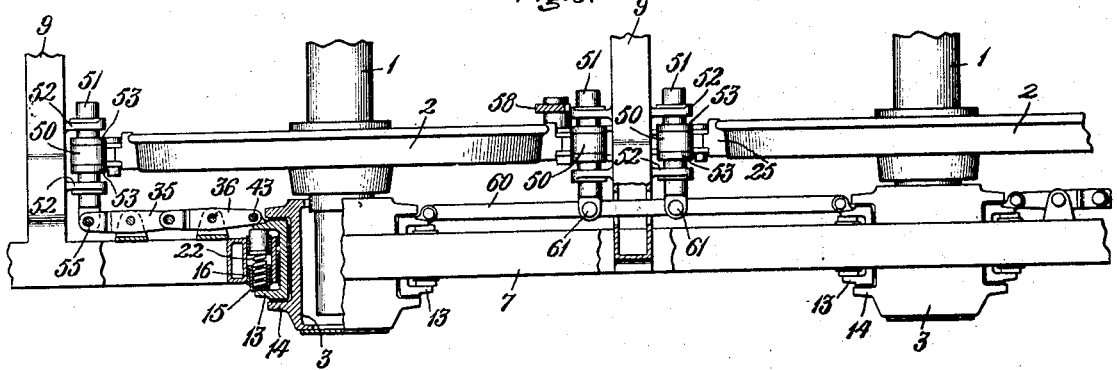
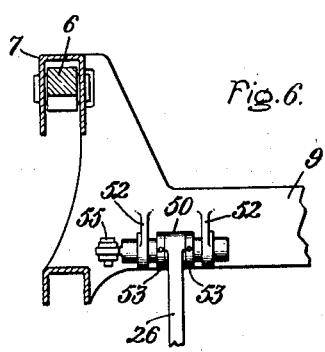

Patented Apr. 16, 1935

1,998,323

UNITED STATES PATENT OFFICE 1,998,323

BRAKE RIGGING

Ole K. Kjolseth, Erie, Pa., assignor to General Electric Company, a corporation of New York Application September 25, 1934, Serial No. 745,434

8 Claims. (Cl. 188—190)

My invention relates to brake riggings for railway vehicles.

In railway vehicles, such as locomotives having a plurality of wheel and axle assemblies carried in a rigid frame, it is desirable to arrange one or more of the axles for lateral movement with respect to the frame in order to decrease the side thrust of the wheels on the rails. This movement may be of considerable magnitude, as for instance two or three inches. In a vehicle of this type, it is desirable to provide an arrangement for maintaining the brake shoes in alignment with the wheel rims which act as the braking surface during the lateral movement of the wheels.

An object of my invention is to provide an improved arrangement for maintaining brake shoes in alignment with the braking surface during lateral movement of the wheels with respect to a frame. I accomplish this by providing a laterally movable brake hanger which is connected through a linkage mechanism to the wheel and axle assembly so that the lateral movement of the wheels with respect to the frame causes the brake shoes to be correspondingly moved in order to maintain the brake shoes in alignment with the rim of the wheel.

Further objects and advantages of my invention will become apparent as the following description proceeds and the features of novelty which characterize my invention will be pointed out with particularity in the claims annexed to and forming a part of this specification.

Figure 1:
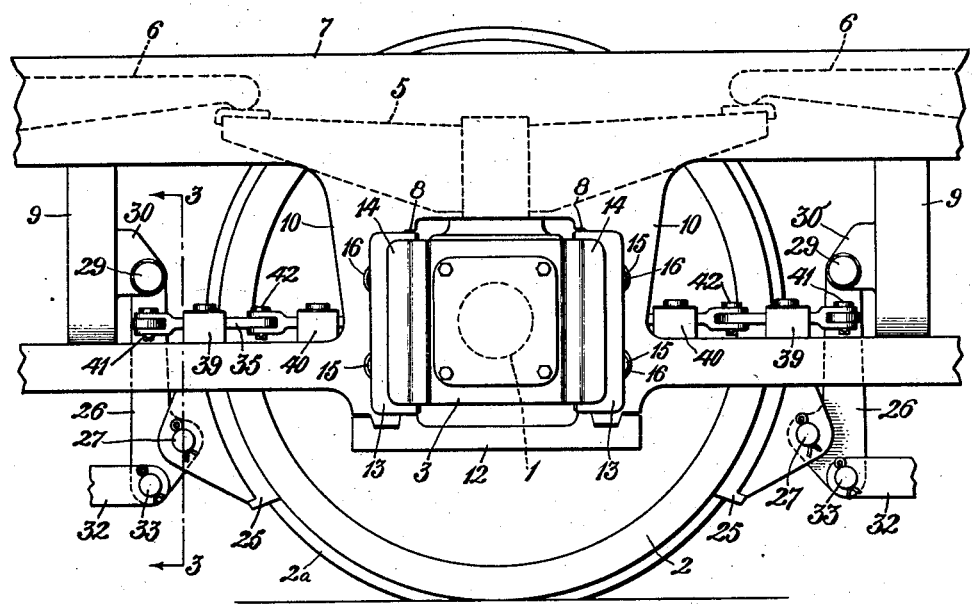
Figure 2:
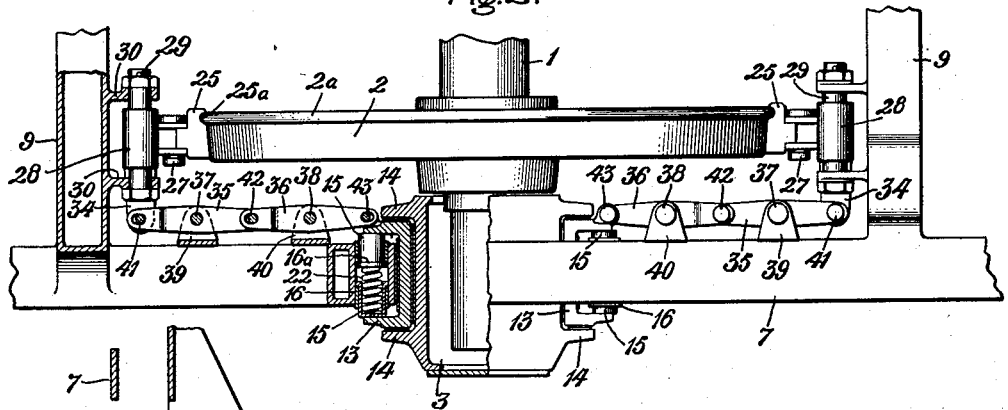
Figure 3:
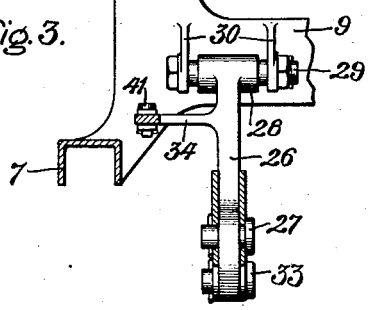

In the drawings, Fig. 1 is a fragmentary elevation of a vehicle having a brake rigging embodying my invention; Fig. 2 is a plan view partly in section of the vehicle shown in Fig. 1; Fig. 3 is a sectional view on the line 3—3 of Fig. 1; Fig. 4 is a fragmentary elevation of a vehicle having a brake rigging embodying a modification of my invention; Fig. 5 is a plan view partly in section of the vehicle shown in Fig. 4; and Fig. 6 is a sectional view on the line 6—6 of Fig. 4.

Referring to the drawings, I have shown my invention in connection with a locomotive having an axle 1 with a wheel 2 and a journal box 3 mounted thereon. The locomotive has a rigid frame including a side frame 7 and spaced cross beams 9. The side frame has integral pedestal jaws 10 having a pedestal cap 12 fastened to the lower ends. The weight of the locomotive is carried on the journal boxes by a transverse spring 5 resting on the journal box intermediate the ends and having equalizers 6 bearing on each end. In order to provide for lateral movement of the wheels with respect to the rigid frame, I have provided channel-shaped pedestal shoes 13 arranged for lateral movement with respect to the side frame. The pedestal shoes cooperate with guide flanges 14 on the journal box to permit relative vertical movement between the journal box and the vehicle frame. The upper end of each of the pedestal shoes rests against a projection 8 on the pedestal jaws and the lower end of each pedestal shoe rests on the pedestal cap 12.

The pedestal shoes are resiliently centered on the pedestal jaws 10 by coil springs 22 having cups 15 which fit over each end of the spring and engage the inner surface of the flanges of the pedestal shoes. The cups are slidable in bushings 16 secured in openings in the pedestal jaws, outward movement being limited by the engagement of the flanges 16a of the cups with the bushings 16. When wheel 2 is caused to move laterally with respect to the side frame 7 by unevenness or curvature of the rails, the journal box 3 and pedestal shoes 13 will move with the wheel causing the cups 15 on one side of the pedestal shoe to compress the springs 22 and thus resiliently center the wheels with respect to the frame. This axle restraint device is not part of my invention but is the invention of W. de Supinski and is described in an application, Serial No. 730,424, filed June 13, 1934, which is assigned to the General Electric Company, assignee of this invention.

Braking is effected by brake shoes 25 which are supported adjacent the wheel 2 and bear on the rim of the wheel which acts as a braking surface. The brake shoes have a groove 25a which engages the flange 2a of the wheel when braking. Each brake shoe 25 is pivotally fastened by pin 27 to a brake hanger 26 which is pivotally supported on a pin 29 secured to lugs or projections 30 on the cross beam 9 of the frame. In order to permit lateral movement of the brake hanger relative to the frame, the spacing of lugs 30 is greater than the width of the strap portion 28 of brake hanger 26 whereby suitable clearance is provided to permit hanger 26 to slide on hanger pin 29 laterally of the vehicle frame. An actuating lever 32, which is connected to any suitable brake-actuating mechanism, is pivotally connected to the lower end of the brake hanger 26 by means of pin 33 and moves the brake shoes into braking engagement with the rim of the wheel.

In accordance with my invention, the brake shoes are maintained in alignment with the laterally movable wheel by providing a lever system connected between the brake hanger and the wheel and axle assembly which maintains the brake shoes in alignment with the rim of the wheel.

In the particular embodiment of my invention shown, the laterally movable pedestal shoes 13 is connected to an arm 34 on brake hanger 26 by a linkage mechanism comprising levers 35 and 36 which are pivoted intermediate their ends on pins 37 and 38 supported respectively from side frame 7 by lugs 39 and 40. One end of lever 35 is connected to arm 34 by a pin and slot connection as shown at 41 and the opposite end is connected to an end of lever 36 by a similar pin and slot connection as shown at 42. The other end of lever 36 is connected to the pedestal shoe 13 by a pin and slot connection 43. It will be apparent that the pin and slot connections are provided for the purpose of compensating for changes in the length of the lever arms as the levers turn on their fixed pivots 37 and 38.

The operation of my improved lateral alignment mechanism for brake rigging will be apparent from an inspection of Fig. 2. As the wheel and axle assembly moves toward side frame 7, pedestal shoes 13 will move therewith and turn lever 36 about its pivot point 38 in a clockwise direction. Such movement of lever 36 will impart a corresponding movement in a counter clockwise direction to the lever 35, which movement of lever 35 will impart to brake hanger 28 a movement corresponding in direction and magnitude to the movement of the wheel and axle assembly so that brake shoe 25 will be maintained in alignment with the rim of wheel 2.

In Figs. 4, 5, and 6, I have shown a modification of the brake rigging embodying my invention applied to a locomotive having a rigid frame supported on two axles carried in two sets of pedestal jaws spaced along the frame. Provision is made for lateral movement of both of these axles with respect to the frame in order to decrease the side thrust on the rails. The construction and manner of supporting the frame and the arrangement for permitting lateral movement of the axles with respect to the frame is identical with the arrangement shown in Figs. 1 and 2 and corresponding parts are indicated by the same reference characters.

In the brake rigging shown at the left of Figs. 4 and 5, the brake shoe 25 is pivotally connected to a brake hanger 26 by a pin 27. The upper end 50 of the brake hanger is rotatably carried on a pin 51 which is slidable in ears 52 secured to the cross beam 9 of the locomotive frame. Discs 53 which are secured to the pin 51 on either side of the upper end of the brake hanger prevent lateral movement of the brake hanger with respect to the pin and also prevent the removal of the pin 51 from the ears 52. The brake shoe 25 is moved into engagement with the rim of the wheel by a brake rod 54, one end of which is shown connected to the lower end of the brake hanger 26.

When the locomotive is rounding a curve or passing over an uneven track, the axle restraint device illustrated will permit the wheel and axle assembly to move relative to the frame of the locomotive. In order to maintain the brake shoe in alignment with the rim of the wheel at all times, I use the lever system comprising levers 35 and 36 which is illustrated in Figs. 1 and 2 and has been described in connection with these figures. The right hand end of the lever 36 is connected by a pin and slot connection 43 to the pedestal shoe 13 as in the arrangement shown in Figs. 1 and 2. The left hand end of the lever 35 is connected to one end of the sliding pin 51 by a pin and slot connection 55. Lateral movement of the wheel and axle assembly with respect to the frame causes a corresponding lateral movement of the pedestal shoe 13 which is transmitted through the lever system to the sliding pin 51 and moves the brake hanger 26 sufficiently to maintain the brake shoe 25 in alignment with the rim of the wheel 2. By connecting the lever system to the sliding pin 51 rather than to the brake hanger 26 as in the arrangement shown in Figs. 1, 2 and 3, the tendency of the brake hanger to bind during lateral movement is decreased. This is due to the fact that the force tending to move the brake hanger is in line with the sliding surfaces which guide the movement of the brake hanger.

At the right hand side of Figs. 4 and 5, I have illustrated a simplified arrangement which can be used in locomotives having two or more axles arranged for lateral movement with respect to the frame. In this modification the brake shoes 25 are carried by brake hangers 26 which are pivotally carried on pins 51 in the same manner as the construction illustrated at the left hand side of Figs. 4 and 5. The brake shoes are moved into and out of engagement with the rims of the respective wheels by a toggle comprising links 56 and 57 which are pivotally connected to the lower ends of the brake hangers 26. The toggle is operated by a lever 58 which is pivotally connected to the extended portion 59 of lever 57. The brake shoes are maintained in alignment with the rims of the wheels during lateral movement of the wheel and axle assemblies by a beam 60 which is connected at either end to one of the pedestal jaws 13. Intermediate the ends thereof, the beam 60 is pivotally connected at 61 to each of the sliding pins 51. With this arrangement, lateral movement of each of the axles 1 is transmitted through the beam 60 to the sliding pins 51 and through these pins moves the brake hangers 26 sufficiently to maintain the brake shoes in alignment with the wheels. This arrangement maintains accurate alignment of the brake shoes when both axles are moved laterally with respect to the frame by substantially the same amount. Since this is the usual case under normal operating conditions, this arrangement provides a satisfactory method for maintaining the brake shoes in alignment with the axles, which is simple and has very few parts.

It will be seen that I have provided a compact, simple arrangement for maintaining the brake shoes in alignment with the wheel during lateral movement of the wheel and axle assembly.

Although I have disclosed particular embodiments of my invention I do not desire to be limited to the specific arrangements set forth and I intend in the appended claims to cover all modifications which do not depart from the spirit and scope of my invention.

What I claim as new and desire to secure by Letters Patent of the United States is,—

1. A railway vehicle comprising a frame, a wheel and axle assembly having a braking surface arranged for lateral movement with respect to said frame, a brake supported on said frame and laterally movable relative to said frame, and means on said frame actuated by a lateral movement of said assembly for maintaining said brake in alignment with said braking surface.

2. A railway vehicle comprising a frame, a wheel and axle assembly arranged for lateral movement with respect to said frame, a brake supported on said frame adjacent a wheel of said assembly and laterally movable relative to said frame, and a lever system actuated by a lateral movement of said assembly for maintaining said brake in alignment with said wheel.

3. A railway vehicle comprising a frame having pedestal jaws, pedestal shoes arranged for lateral movement relative to said pedestal jaws, a wheel and axle assembly having a journal box vertically slidable in said pedestal shoes, a brake supported on said frame adjacent a wheel of said assembly and laterally movable with respect to said frame, and means responsive to lateral movement of said pedestal shoes for maintaining said brake in alignment with said wheel.

4. A railway vehicle comprising a frame having pedestal jaws, pedestal shoes arranged for lateral movement relative to said pedestal jaws, a wheel and axle assembly having a journal box vertically slidable in said pedestal shoes, a brake supported on said frame adjacent a wheel of said assembly and laterally movable with respect to said frame, and means including a lever system connected to said pedestal shoes and said brake for maintaining said brake in alignment with said wheel.

5. A railway vehicle comprising a frame, a wheel and axle assembly having a journal box arranged for lateral movement relative to said frame, a brake adapted to engage a wheel of said assembly, a laterally movable hanger for supporting said brake on said frame, and means engaging said hanger and responsive to lateral movement of said journal box for maintaining said brake in alignment with said wheel.

6. A railway vehicle comprising a frame having pedestal jaws, pedestal shoes laterally movable relative to said jaws, a wheel and axle assembly having journal boxes vertically slidable in said pedestal shoes, a brake adapted to engage a wheel of said assembly, a laterally movable hanger for supporting said brake, and a lever system supported on said frame and engaging said hanger and said pedestal shoes maintaining said brake in alignment with said wheel.

7. A railway vehicle comprising a frame having a pair of spaced sets of pedestal jaws, a pedestal shoe in each of said sets of pedestal jaws laterally movable relative to said jaws, a wheel and axle assembly carried in each of said sets of pedestal jaws and having a journal box vertically slidable in said pedestal shoes, a brake adapted to engage a wheel of each wheel and axle assembly, and means including a beam connected between said pedestal shoes for maintaining said brakes in alignment with said wheels.

8. A railway vehicle comprising a frame having a pair of spaced sets of pedestal jaws, a pedestal shoe in each of said sets of pedestal jaws laterally movable relative to said jaws, a wheel and axle assembly carried in each of said sets of pedestal jaws and having a journal box vertically slidable in said pedestal shoes, a brake adapted to engage a wheel of each wheel and axle assembly, means including a laterally movable hanger for supporting each brake, and means including a beam connected between said pedestal shoes and engaging said hangers for maintaining said brakes in alignment with said wheels.

OLE K. KJOLSETH.